United States Patent

Ogata et al.

Patent Number: 5,656,357
Date of Patent: Aug. 12, 1997

[54] MOLDED CORRUGATED CARDBOARD AND METHOD FOR PRODUCING SAME

[75] Inventors: Mitsutoshi Ogata; Kunio Cho; Yutaka Sato, all of Tokyo, Japan

[73] Assignee: Tri-Walk K.K., Tokyo, Japan

[21] Appl. No.: 497,908

[22] Filed: Jul. 3, 1995

Related U.S. Application Data

[63] Continuation of Ser. No. 124,591, Sep. 21, 1993, abandoned.

[51] Int. Cl.$^6$ .................. B32B 3/28; B32B 5/00; B60J 7/00

[52] U.S. Cl. .............. 428/182; 428/175; 428/178; 428/192; 428/193; 428/194; 428/196; 156/242; 156/245; 264/241; 264/257; 264/505; 264/510; 296/214

[58] Field of Search ............... 428/182, 192, 428/72, 125, 175, 178, 193, 194, 196, 233, 245, 284; 156/242, 245, 250; 296/210, 214; 264/510, 546, 505, 241, 257, 285, 286

[56] References Cited

U.S. PATENT DOCUMENTS 4,933,225  6/1990  Abe ........................... 428/157

FOREIGN PATENT DOCUMENTS

| | | |
|---|---|---|
| 0053747 | 6/1982 | European Pat. Off. . |
| 2415688 | 8/1979 | France . |
| 2480181 | 10/1981 | France . |
| 55-23534 | 6/1980 | Japan . |
| 55-34685 | 9/1980 | Japan . |
| 56-30179 | 7/1981 | Japan . |
| 2209136 | 5/1989 | United Kingdom . |

OTHER PUBLICATIONS

United Kingdom Search Report.
British Examiner's Official Action.

*Primary Examiner*—Donald Loney
*Attorney, Agent, or Firm*—Greenblum & Bernstein P.L.C.

[57] ABSTRACT

Corrugated cardboard is molded into a desired shape for use in interior trim, such as for use in lining the ceiling of an automobile. The molded corrugated cardboard is obtained by applying a hot-melt adhesive onto all or at least a portion of a side of a base layer of, for example, resin felt or non-woven fabric. The base layer is then applied to a plate-like corrugated cardboard layer such that the hot melt adhesive is between the two layers. The corrugated cardboard and base layers are then molded together. The base layer may be put on only a portion of the cardboard layer where molding is apt to cause wrinkling or rupture of the cardboard layer, or the base layer may be applied to an entire surface of the corrugated cardboard layer. Even if the corrugated cardboard wrinkles or ruptures during molding, the wrinkle or rupture is filled by lofting of the base layer which is simultaneously molded in a superimposed state on the corrugated cardboard. Thus, when a decorative skin layer is laminated to the surface of the molded article, any wrinkles or ruptures which were generated during the molding process do not appear on the surface of the finished product.

9 Claims, 2 Drawing Sheets

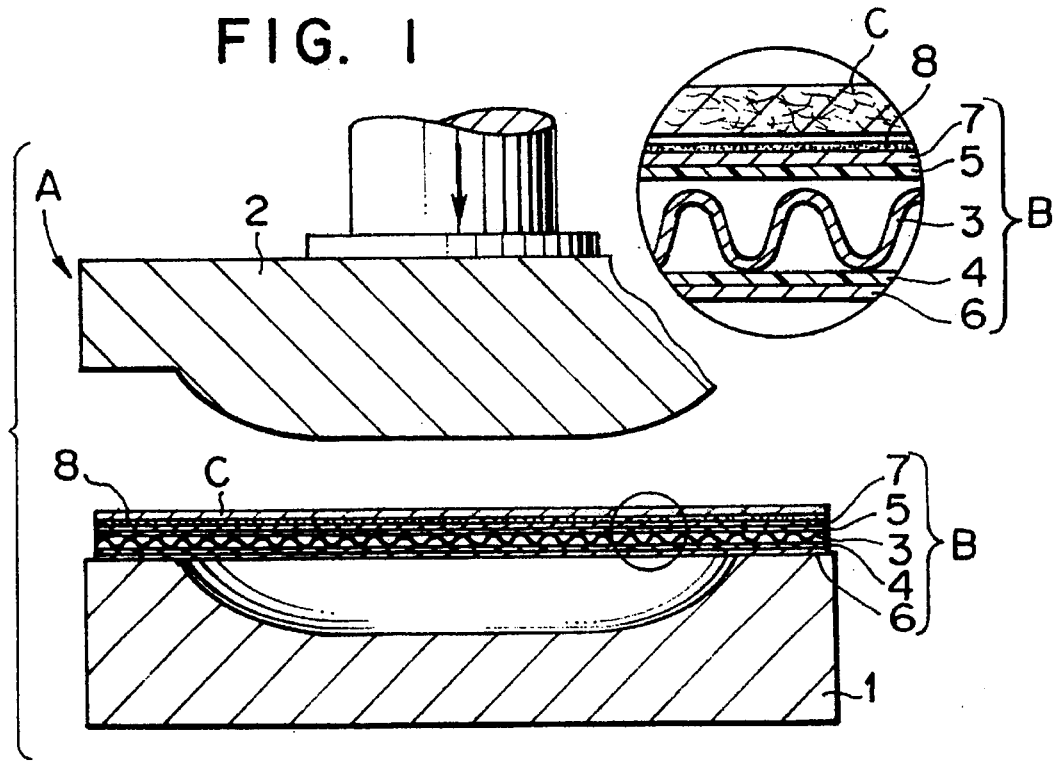
FIG. 1
FIG. 1A
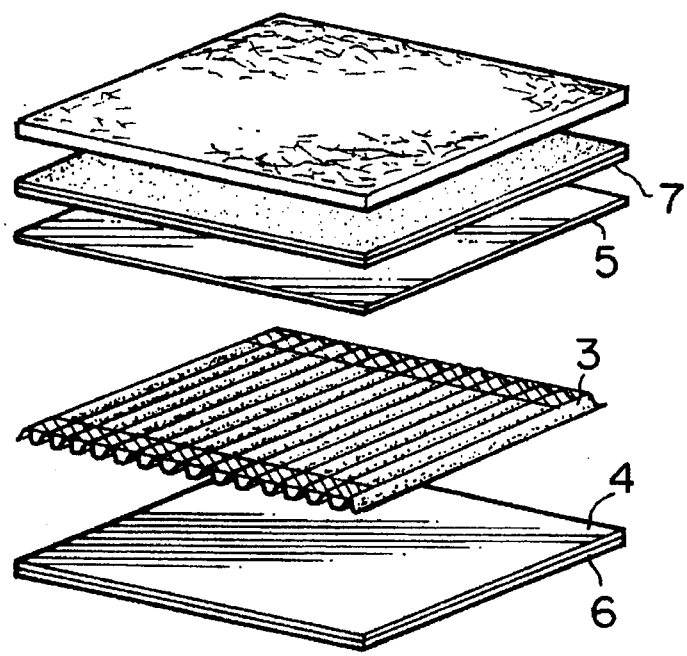
FIG. 2

FIG. 3
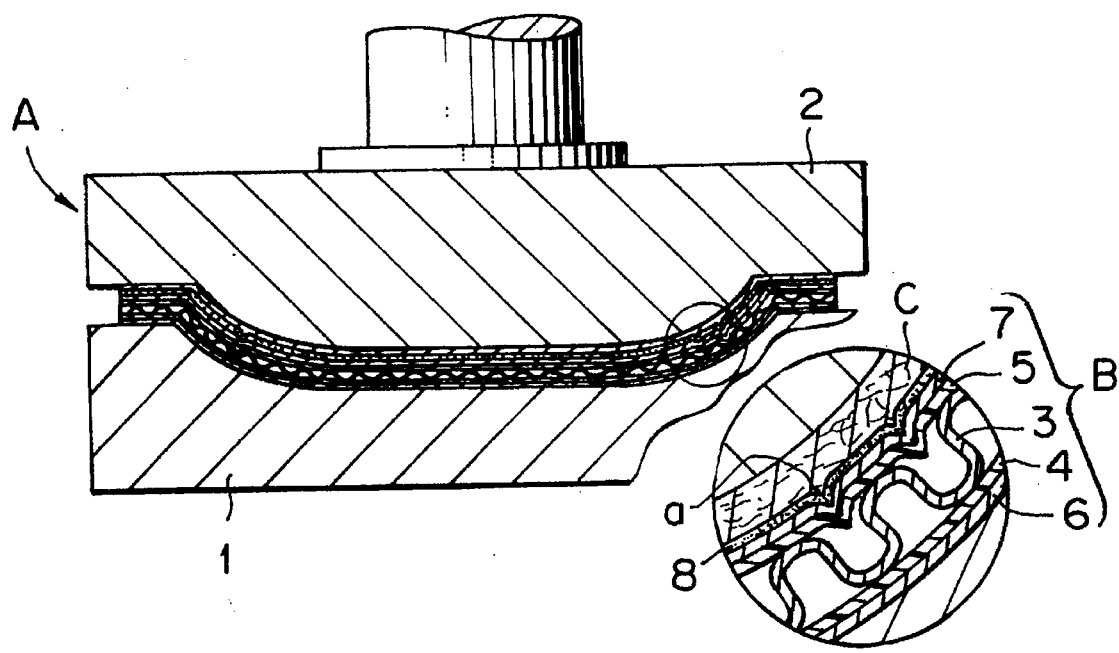
FIG. 3A
FIG. 4
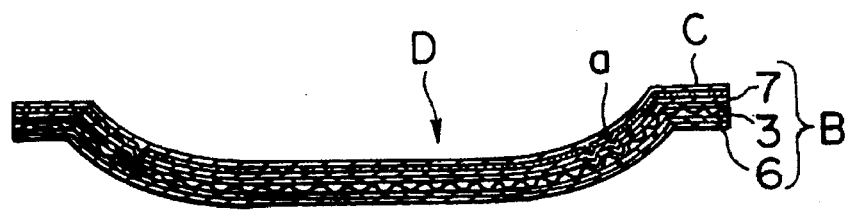

MOLDED CORRUGATED CARDBOARD AND METHOD FOR PRODUCING SAME

This application is a continuation of application Ser. No. 08/124,591, filed Sep. 21, 1993, now abandoned.

FIELD OF THE INVENTION

The present invention relates to a corrugated cardboard molded into a desired shape for use as a base for interior trim, for example, in automobiles, ships or houses or for use as a certain kind of package as well as a method for producing such molded corrugated cardboard.

BACKGROUND INFORMATION

Heretofore, it has already been known to a base member comprising a molded corrugated cardboard and a decorative skin layer laminated to the surface thereof as a base member for interior trim in automobiles, ships, houses, etc., for example as an interior trim base for the ceiling of an automobile.

In producing such base member for interior trim, it is necessary that corrugated cardboard be molded under heating and pressure into a roof shape of an automobile for example alone or together with a skin layer.

However, since corrugated cardboard itself does not have elasticity in the case where corrugated cardboard after molding has a portion of a large curvature such a deep-drawn portion, the inner surface of that portion is often wrinkled or broken.

Such wrinkle or rupture of the corrugated cardboard after molding appears as a scar on the surface of the skin layer, resulting in impairment of the external appearance and deterioration of the commercial value.

As a measure against such wrinkle or rupture of the corrugated cardboard after molding, there is described in Japanese Patent Publication No. 23534/80 a method wherein corrugated cardboard is subjected to drawing so that the clearance between upper and lower dies of a pressing die is smaller in the portion of the corrugated cardboard after molding where wrinkle or rupture is apt to occur than in the other portion, that is, the crushing thickness for such former portion is larger than that for the other portion.

However, the molded corrugated cardboard obtained by such method involves a problem in point of rigidity in some particular use because the core part of the swaged portion is crushed. Also in moldings it is necessary to use a special molding die wherein the clearance between upper and lower dies is smaller in the portion where wrinkle or rupture is apt to occur in the corrugated cardboard after molding than in the other portion, thus resulting in increase of the manufacturing cost.

In Japanese Patent Publication No. 55-34685 there is described a corrugated cardboard molding method wherein, in molding a corrugated cardboard base under heating and pressure, a notch is formed beforehand in the portion thereof to be subjected to drawing so that at the time of drawing the said notch is opened to permit elongation of the drawn portion of the corrugated cardboard and thereby prevent cracking of the same portion.

However, such conventional method premises forming a mounting hole for a functional component such as a room lamp in the drawn portion, and the aforementioned notch is formed in a narrower range than the hole opening range, then the notched portion is removed in the hole opening process, so that in the case where a hole is not formed in a trim panel, the notch appears as a scar on the skin layer surface. Therefore, such conventional method is not applicable.

Also known is a method wherein the liner of the portion where wrinkle or rupture is apt to occur in the shape after molding, such as as the inner surface of the portion to be subjected to drawing of corrugated cardboard, is slit in advance, followed by pressing, allowing the slit to accept elongation of the liner to thereby prevent the occurrence of wrinkle or rupture as far as possible. According to this conventional method, there is used a corrugated cardboard wherein a pair of liners and a core are bonded together with an adhesive, e.g. a thermoplastic resin, and at least one liner and the core are fixed to each other temporarily in a weak peeling strength, which corrugated cardboard is described in Japanese Patent Publication No. 56-30179, then the liner fixed temporarily to the core is once peeled off, then is slit using a slitter or the like and thereafter again laminated to the core. Thus, the operations are complicated and hence the productivity is poor. Besides, even by this conventional method, it is difficult to completely prevent the occurrence of wrinkle or rupture.

OBJECTS OF THE INVENTION

The present invention has been accomplished in view of the above-mentioned problems of the prior art and it is the object of the invention to provide a base member for interior trim or a package base made of corrugated cardboard wherein even in the event of occurrence of wrinkle or rupture in the corrugated cardboard itself after molding, such wrinkle or rupture is prevented from appearing as a scar on the surface of a decorative skin layer laminated to the corrugated cardboard surface, as well as a method for molding such corrugated cardboard base without deterioration of the productivity or great increase of cost.

In order to achieve the above-mentioned object, the corrugated cardboard according to the present invention is characteristic in that a base layer obtained by fixing a group of individual fibers using a binder is laminated to the surface side of at least a drawn portion of the corrugated cardboard molded into a desired shape.

In the corrugated cardboard constructed as above, even in the event of occurrence of wrinkle or rupture in the corrugated cardboard after molding, such wrinkle or rupture is covered in a filled-up state with the base layer and so the wrinkled or ruptured portion becomes flush with the other portion, so in the case of laminating a surface layer thereto, there is no fear of such wrinkle or rupture appearing as a soar on the surface layer. Further, since there is no likelihood of the core of the corrugated cardboard being crushed partially, there is no fear of deterioration in rigidity.

The base layer obtained by fixing a group of individual fibers with a binder may be provided on only the surface of the corrugated cardboard after drawing where wrinkle or rupture is apt to occur, or it may be provided throughout the whole surface of the corrugated cardboard.

In the former case, that is, in the case of providing the base layer partially, it is necessary for the base layer to have a thickness sufficient to absorb wrinkle or rupture of the corrugated cardboard to smooth the corrugated cardboard surface and which thickness does not permit a difference in thickness between the base layer-applied portion and non-applied portion of the corrugated cardboard to appear markedly on the skin layer surface.

On the other hand, the method of the present invention for molding the corrugated cardboard described above is characterized in that a base layer obtained by fixing a group of individual fibers with a binder is put through an adhesive onto at least a portion of the side to serve as a surface after molding of a flat plate-like corrugated cardboard in which portion wrinkle or rupture is apt to occur after molding, the flat plate-like corrugated cardboard comprising a corrugated core and liners laminated to both sides of the core through thermoplastic resin films, thereafter the corrugated cardboard and the base layer are molded together under heating and pressure.

According to such molding method, since a pulling force is absorbed by mutual deviations of the fibers in the base layer, there will occur neither wrinkle nor rupture in the base layer itself. In the event of occurrence of wrinkle or rupture in the base layer, the base layer is laminated to the corrugated cardboard while following the wrinkle or the rupture, but the wrinkled or ruptured portion is filled up by lofting of the base layer and hence the surface is free of concave or convex.

In molding, moreover, all that is required is only putting the base layer obtained by fixing a group of individual fibers with a binder onto the flat plate-like corrugated cardboard through an adhesive and conducting molding under heating and pressure simultaneously. Therefore, it is not necessary to use a special pressing die wherein the clearance between upper and lower dies is smaller in the portion where wrinkle or rupture is apt to occur in the corrugated cardboard shape after molding than in the other portion. It is not necessary, either, to perform a complicated operation of once peeling off a liner which has already been laminated to the core, then slitting it with a slither or the like and thereafter laminating it again to the core. Thus, the manufacturing cost is low and the productivity is high.

BRIEF DESCRIPTION OF THE DRAWINGS

An embodiment of the present invention will be described below with reference to the accompanying drawings to further illustrate the present invention.

FIG. 1 is a explanatory view of a method for producing a molded corrugated cardboard according to the present invention, showing a state in which a corrugated cardboard and a base layer are put on a stationary lower die of a hot press;

FIG. 1A is an enlarged view of the circled area shown in FIG. 1;

FIG. 2 is an exploded perspective view of the corrugated cardboard and the base layer;

FIG. 3 is an explanatory view showing a state of molding under heating and pressure;

FIG. 3A is an enlarged view of the circled area shown in FIG. 3;

FIG. 4 is a sectional view of the corrugated cardboard after molding and after removal from the die.

DETAILED DESCRIPTION OF PREFERRED EMBODIMENTS

In FIG. 1, the reference mark A denotes a hot press, which is of a known structure and shape and comprises a fixed lower die 1 as a female die and a movable upper die 2 as a male die. Though not shown, the molding surfaces of both dies 1 and 2 are heated to a predetermined molding temperature by a suitable heating means.

The reference mark B denotes a flat plate-like (e.g., plate-shaped) corrugated cardboard to be pressed by the hot press A. The corrugated cardboard B comprises a corrugated core 3 and liners 6 and 7 laminated to both sides of the core 3 through thermoplastic resin films, e.g. polyethylene films, 4 and 5, respectively. One liner 6 is bonded completely to the core 3, while the other liner 7 is temporarily fixed to the core only at both side portions thereof so as to permit sliding of the liner 7 and the core 3 relative to each other at the time of pressing, and thus the peeling strength thereof is low.

The flat plate-like corrugated cardboard B is put on the fixed lower die 1 of the hot press A so that the liner 7 temporarily fixed to the core 3 constitutes an upper surface, then the movable upper die 2 is brought down to effect molding between both dies 1 and 2 under heating and pressure. In this case, according to the present invention, a base layer C obtained by fixing a group of individual fibers with a binder is put on the corrugated cardboard B through a hot melt adhesive 8, and the corrugated cardboard B and the base layer C are molded together. The present invention is characteristic in this point.

For example, the base layer C obtained by fixing a group of individual fibers with a binder is resin felt of non-woven fabric of polyester. In the former and latter cases the base layer C is put on the upper surface of the corrugated cardboard B at rates of 100–500 g/m$^2$ and 50–100 g/m$^2$, respectively.

The base layer C may be put partially on a portion, or a curvedly molded portion of the upper surface of the corrugated cardboard B where molding is apt to cause wrinkle or rupture, but it is desirable that the base layer C be put on the whole upper surface of the corrugated cardboard B.

On the other hand, the hot melt adhesive 8 is constituted, for example, by a polyolefin- or polyamide-based hot melt film. It may be laminated beforehand to the liner 7 of the corrugated cardboard B, or film or sheet thereof may be put on the liner 7.

Under heating and pressure through the upper and lower dies e 1, 2 of the hot press A described above, the flat plate-like corrugated cardboard B is formed into a shape which follows the molding surfaces of both dies. The resin films 4 and 5 which were softened and melted in the molding are cooled to solidify after removal of the molded product from the pressing die, whereby the predetermined molded shape is retained.

On the other hand, the base layer C obtained by fixing a group of individual fibers with a binders e.g. resin felt or non-woven fabric of polyester, is molded simultaneously with the corrugated cardboard B and and is integrally bonded to the surface of the corrugated cardboard to cover the same surface by means of the adhesive 8 which has been heat-melted.

In this case the molding may cause wrinkle or rupture in the corrugated cardboard B, but there is no likelihood of the base layer C being wrinkled or ruptured because its constitutent fibers can be displaced relative to one another.

In the event of occurrence of wrinkle or rupture in the corrugated cardboard as a result of molding, the base layer C is molded following such wrinkle or rupture as shown in FIG. 3, but since the base layer is molded in such a manner that the portion of such wrinkle or rupture, indicated at a, see FIG. 3A, is thicker than the other portion in a filled-up state due to lofting of the base layer, any concave or convex which follows such wrinkle or rupture of the corrugated cardboard B does not appear on the surface of the base layer.

Thus, even when wrinkle or rupture occurs in the corrugated cardboard B for example, such wrinkle or rupture is covered in a filled-up state with the base layer C, so in the case of a surface layer being laminated to the thus-molded corrugated cardboard indicated at D, there is no fear of such wrinkle or rupture appearing as a scar on the surface of the surface layer.

What we claim is:

1. A molded corrugated cardboard product comprising:

a corrugated cardboard molded in a predetermined shape, said corrugated cardboard comprising a corrugated core and a pair of liners, wherein one of said pair of liners is located on each of opposite surface sides of said corrugated core, respectively, and further wherein one of said pair of liners is laminated to only edges of said surface side of said corrugated core to permit sliding of said one of said pair of liners with respect to said corrugated core during molding; and a base layer laminated to at least a portion of one of said pair of liners on said molded corrugated cardboard which portion has been subjected to drawing, said base layer comprising a group of individual fibers fixed together with a binder.

2. A molded corrugated cardboard according to claim 1, wherein the other of said pair of liners is completely bonded to said surface side of said corrugated core opposite of said surface side to which said one of said pair of liners is laminated to only said edges thereof.

3. A molded corrugated cardboard according to claim 1, wherein said base layer is laminated to said one of said pair of liners which is laminated to only edges of said surface side of said corrugated core.

4. A method for producing a molded corrugated cardboard product, comprising:

laminating a corrugated core with a pair of liners on opposite surface sides of the corrugated core to form a plate-shaped corrugated cardboard, whereby at least one of the pair of liners is laminated only to edges of the respective surface side, to allow sliding of the liner with respect to the corrugated core during molding;

applying a base layer through a hot melt adhesive onto at least a portion of one of the pair of liners to serve as a surface after molding of the flat plate-shaped corrugated cardboard in which portion wrinkle or rupture is apt to occur after molding, said base layer comprising a group of individual fibers fixed together with a binder; and molding said corrugated cardboard and said base layer thereon simultaneously by the application of pressure and heat.

5. The method of claim 4, wherein said base layer comprises a group of individual fibers fixed together with a binder is resin felt.

6. The method of claim 4, wherein said base layer comprises a group of individual fibers fixed together with a binder is non-woven fabric of a polyester.

7. The method of claim 4, wherein, in the state prior to the molding of the corrugated cardboard, the at least one of the pair of liners which is laminated only to edges of the respective surface side, is in a temporarily fixed state to said core and a peeling strength thereof is kept low.

8. The method of claim 4, wherein the laminating of the other of the pair of liners comprises completely bonding the other of the pair of liners to the surface side of the corrugated core opposite of the surface side to which the one of the pair of liners is laminated to only edges thereof.

9. The method of claim 4, wherein the base layer is applied to the one of the pair of liners which is laminated to only edges of the surface side of the corrugated core.

* * * * *

UNITED STATES PATENT AND TRADEMARK OFFICE
CERTIFICATE OF CORRECTION

PATENT NO. : 5,656,357
DATED : August 12, 1997
INVENTOR(S) : MITSUTOSHI OGATA

It is certified that error appears in the above-indentified patent and that said Letters Patent is hereby corrected as shown below:

On the title page of the printed patent, in section [73], Assignee, change "Tri-Walk K.K.," to ---Tri-Wall K.K.,---.

Signed and Sealed this

Fourth Day of August, 1998

Attest:

Attesting Officer

BRUCE LEHMAN

Commissioner of Patents and Trademarks